Sept. 2, 1930.   L. Q. STOCKTON   1,774,817
DEVICE FOR EXHIBITING PICTURES WITH COLORED SCENERY
Filed May 18, 1925
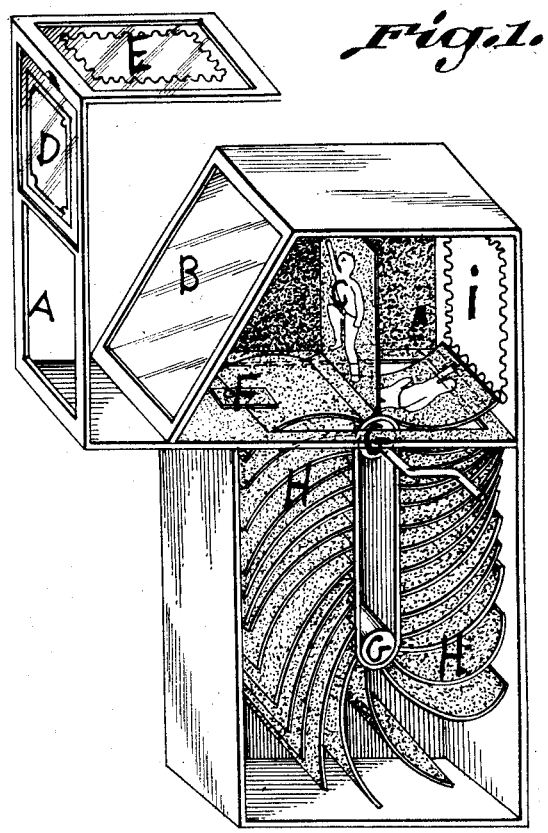
Fig.1.
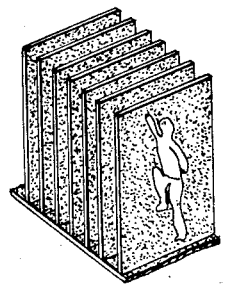
WITNESS. Fig.2.
Robert E. Tucker
Nellie G Tucker
Inventor
Leander. Q. Stockton Patented Sept. 2, 1930

1,774,817

UNITED STATES PATENT OFFICE

LEANDER Q. STOCKTON, OF TROY, NEW HAMPSHIRE

DEVICE FOR EXHIBITING PICTURES WITH COLORED SCENERY

Application filed May 18, 1925. Serial No. 31,105.

My invention relates to a device for exhibiting pictures with colored scenery.

It is new and useful and is specially adapted to home amusement, tent shows, and novel advertising. The principle by which the result is obtained is as follows. By reflecting the image of the scenery on the pictures. By means of a glass reflector the image when reflected becomes transparent in accordance with the relative colors and the brightness of the light. The pictures also become transparent when viewed with the reflected image of the scenery in accordance with the relative colors and the brightness of the light. When you view the reflected image of the scenery and the pictures together the figures in the pictures known as the motion part appears to stand out in the foreground in the open space as they would naturally appear.

The object of my invention is first to provide a device that reflects the image in its original colors from a beautiful colored scenery and show it upon the pictures. This part of the device consists of a casing provided with an opening in front to view the pictures and the reflected image of the scenery together from the opening in front. It has a glass reflector fixed therein for the purpose of reflecting the image of the scenery on the pictures. It has scenery placed therein over the opening in front and above the glass reflector in a position that the reflected image of the scenery is shown upon the pictures. At an incline to the line of vision so as to view the two together through said opening my invention also provides means for the continuous displaying of a number of specially made pictures with sufficient rapidity to give to the figures in the picture the appearance of motion. This part of the device consists of a cabinet like casing. It is fixed at the rear and under the glass reflector. Two spaced angular related rollers are fixed in the said casing. At the rear and below the glass reflector an endless belt is fixed on the rollers. The belt has for its purpose to attach the strips of pictures thereon, the pictures to be exhibited being fastened to a strip by one end and attached to the belt when the rollers are turned. The belt is drawn around bringing the pictures around the top roller. The free end of the pictures comes in contact with a catch and is held there until by the increased pressure caused by the moving belt it is released and springs forward with great rapidity taking the place of the picture being viewed that gives the effect of motion to the figure in the pictures while the reflected image of the scenery remains stationary.

My invention also provides specially made pictures, which is the most important part of the invention, to produce the described result. The specially made pictures are made with all parts that are not to be visible or in motion solid black or other dark colors. The figures in the pictures known as the motion part to be visible or shown when viewed with the reflected image of the scenery are made in bright colors. Be it understood these specially made pictures are the most important part of the device. They are fastened on strips by one end to make them easy to be removably fastened to said belt in the manner described.

In the drawing—

Fig. 1 shows the different parts fixed in their relative position to each other.

Fig. 2 shows a portion of a strip of pictures.

Means is provided for adjusting them up and down and backwards and forwards and at different angles so as to be placed in the correct position to produce the described result.

Means is provided also to control the lights on the scenery and the pictures independent of each other so as to increase the brightness of the lights or turn them out entirely.

A shows the opening in front to view the pictures and the reflected image of the scenery together within the line of vision from said opening so as to appear like one picture.

B shows the glass reflector and the relative position in which it is placed to reflect the image of the scenery on the pictures within the line of vision from the opening in front. Be it remembered on this glass reflector depends the showing of the scenery on the pictures.

C shows the figure in the picture known as the motion part placed behind the glass reflector within the line of vision looking through the opening.

D and E show the scenery fixed over the opening in front and above the glass reflector, fixed in accordance with the position of the glass reflector so as to reflect the image of the scenery upon the pictures within the line of vision from said opening.

F shows the catch the loose end of the pictures comes in contact with, and is held until the increased pressure caused by the belt being drawn around causes it to slip by and spring up with great rapidity and take the place of the picture being viewed that gives the effect of motion to the figure in the picture while the reflected image of the scenery remains stationary.

G G shows the two rollers mounted within the lower part of the device in the rear and below the glass reflector with the endless belt placed thereon. The belt has for its purpose to attach the strips of pictures thereon in the manner described.

H shows a strip of pictures attached to the belt. Be it noticed the pictures are solid black on both sides of the leaf except the figure in the picture known as the motion part. Notice also the loose end of the picture is held by the catch below the line of vision looking through the opening in front until it is released. Then it springs in an upright position and is in the line of vision to be viewed with the reflected image of the scenery. The solid black parts of the picture are not visible when viewed with the reflected image of the scenery and gives the appearance of the figure being there in open space.

I shows the dark space and background where the reflected image of the scenery appears to be located when viewed from the opening in front. This dark space and black background are not visible when the reflected image of the scenery is thrown upon it and gives the effect of the scenery being located there in open space at the rear of the pictures.

I claim the following:

A picture exhibiting device comprising a casing provided with an opening, a glass reflector mounted within the casing at an incline to the line of vision through said opening, scenic backgrounds arranged in different angular relation to said glass reflector, a dark background at the rear of and spaced from the glass reflector, spaced angularly related rollers mounted in the casing at the rear and below the glass reflector, an endless belt supported by said rollers, specially made pictures attached to said belt and means for actuating the rollers to present the pictures successively before the opening.

In testimony whereof I affix my signature this 20th day of November, 1929.

LEANDER Q. STOCKTON.